(12) United States Patent
Kim et al.

(10) Patent No.: US 8,963,091 B2
(45) Date of Patent: Feb. 24, 2015

(54) SIGNAL DETECTING CIRCUIT OF INFRARED SENSOR AND METHOD OF CORRECTING SAME

(71) Applicant: Agency for Defense Development, Daejeon (KR)

(72) Inventors: Chi-Yeon Kim, Daegu (KR); Kang-Il Lee, Seoul (KR); Sun-Ho Kim, Daejeon (KR); Hyun-Jin Choi, Daejeon (KR); Nam-Hwan Kim, Daejeon (KR); Sang-Gu Kang, Daejeon (KR)

(73) Assignee: Agency for Defense Development, Daejeon (KR)

( * ) Notice: Subject to any disclaimer, the term of this patent is extended or adjusted under 35 U.S.C. 154(b) by 0 days.

(21) Appl. No.: 14/239,714

(22) PCT Filed: Oct. 30, 2012

(86) PCT No.: PCT/KR2012/008979
§ 371 (c)(1),
(2) Date: Feb. 19, 2014

(87) PCT Pub. No.: WO2013/069916
PCT Pub. Date: May 16, 2013

(65) Prior Publication Data
US 2014/0231651 A1    Aug. 21, 2014

(30) Foreign Application Priority Data

Nov. 7, 2011   (KR) .................. 10-2011-0115234

(51) Int. Cl.
*G01J 5/24*        (2006.01)
*G01J 5/20*        (2006.01)
*G01J 1/46*        (2006.01)
*G01J 5/00*        (2006.01)

(52) U.S. Cl.
CPC .... *G01J 5/24* (2013.01); *G01J 5/20* (2013.01); *G01J 1/46* (2013.01); *G01J 2005/0077* (2013.01); *G01J 2005/202* (2013.01)
USPC ........................................ 250/349

(58) Field of Classification Search
CPC ............... G01J 5/20; G01J 2005/0077; G01J 2005/0048
USPC ........................................ 250/349
See application file for complete search history.

(56) References Cited

U.S. PATENT DOCUMENTS 5,811,808 A * 9/1998 Cannata et al. .......... 250/332

(Continued)

FOREIGN PATENT DOCUMENTS

| JP | 09-261539 A | 10/1997 |
| JP | 10-071987 A | 3/1998 |

(Continued)

OTHER PUBLICATIONS

Search report for International Application No. PCT/KR2012/008979, Dec. 12, 2012.

*Primary Examiner* — Marcus Taningco
(74) *Attorney, Agent, or Firm* — LRK Patent Law Firm

(57) ABSTRACT

A signal detecting circuit of an infrared sensor includes: a cell array in which bolometers sensing infrared rays and outputting signal currents are arranged in an N×M format; a level generator that outputs a plurality of bias voltages corresponding to a plurality of bias levels; N resistor non-uniformity correcting circuits that are located in a column direction of the cell array and supply different bias voltages to each of the bolometers; M resistor non-uniformity correcting circuits that are located in a row direction of the cell array and supply different bias voltages to each of the bolometers; a control unit that sets a bias voltage level of each resistor non-uniformity correcting circuit to correct the resistor non-uniformity of the cell array; and N integrators that integrate the signal currents output from the cell array.

5 Claims, 12 Drawing Sheets

(56) References Cited

U.S. PATENT DOCUMENTS

2006/0231760 A1* 10/2006 Lee et al. .................. 250/338.1
2007/0024290 A1* 2/2007 Endoh ........................ 324/705
2010/0288915 A1* 11/2010 Endo ......................... 250/252.1

FOREIGN PATENT DOCUMENTS

| JP | 2002-365130 A | 12/2002 |
| KR | 10-2007-0082281 A | 8/2007 |
| KR | 10-2009-0030768 A | 3/2009 |

* cited by examiner

FIG. 10A
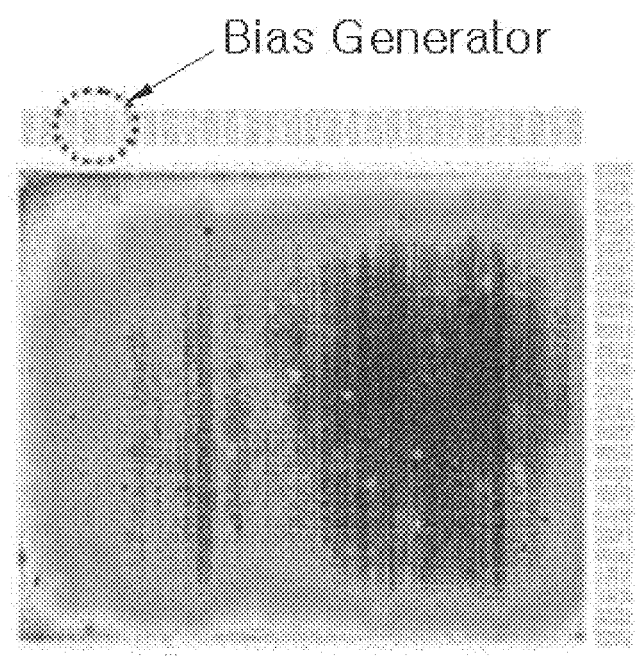
[Constant Bias]
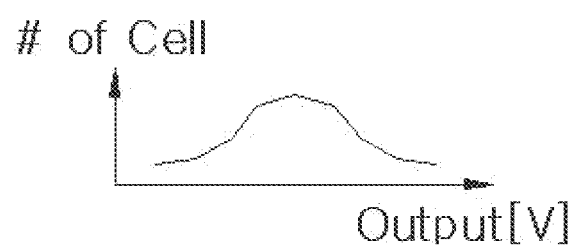

FIG. 10C
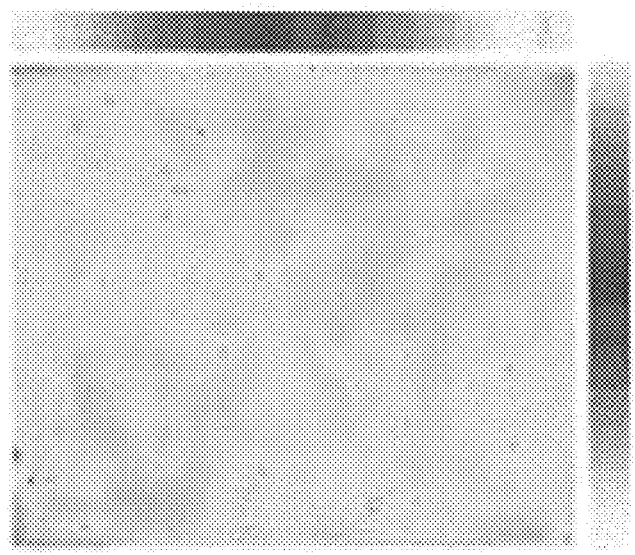
[Column & Row NUC]
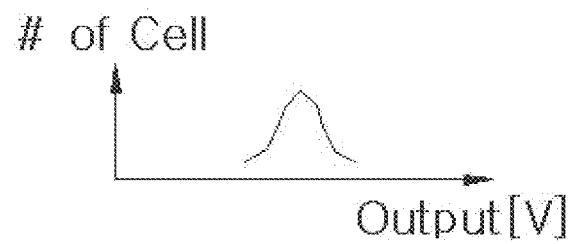

US 8,963,091 B2

SIGNAL DETECTING CIRCUIT OF INFRARED SENSOR AND METHOD OF CORRECTING SAME

TECHNICAL FIELD

The present invention relates to the read-out integrated circuit of an infrared sensor and a method of correcting the same and, more particularly, to a correction method that is capable of minimizing the non-uniformity between pixels in order to improve the performance of an infrared sensor.

BACKGROUND ART

Equipment that acquires an image of a subject by collecting radiant energy emitted from an object without the supply of light from the outside is referred to as an infrared (IR) thermal imaging system. Currently, the fields of application of IR thermal imaging systems have been extended to military equipment such as missile guidance systems, sights for personal weapons, and night visions systems of unmanned aerial vehicles that are used to perform aviation disaster prevention and aerial unmanned reconnaissance and surveillance; thermal imaging diagnosis systems, that is, intelligent medical systems that, in the medical field, measure and analyze minute changes in the temperature of the surface of the human body without imposing pain or burden on the human body, output medical information about the presence or degree of a disease and perform the prevention of a disease; unmanned forest fire monitors; environmental surveillance systems for the monitoring of marine pollution or the like; temperature monitoring systems used in semiconductor processing lines; building insulation and leakage finding systems; and electric/electronic Printed Circuit Board (PCB) circuit and part inspection systems; etc., and the demands therefore have increased.

Infrared sensors function to detect the temperature of a target, and may be basically divided into uncooled infrared sensors and cooled infrared sensors. Uncooled infrared sensors are constructed without a cooling device, and operate based on the principle of detecting a change in the characteristic of a material at a room temperature of about 300 K. Among uncooled infrared sensors, micro-bolometers are resistance thermometers used to measure an infrared ray, and use metal or a semiconductor having the property in which when an infrared ray is applied, temperature increases and electric resistance changes as a detection element. Bolometer-type infrared sensors detect a current signal generated by a change in the resistance of a detection element attributable to an infrared ray via a read-out integrated circuit (ROIC), perform the signal processing of the current signal, output the processed current signal, thereby providing the results of temperature detection.

FIG. 1 is a basic configuration diagram of the ROIC 10 of an uncooled infrared sensor.

The ROIC 10 includes a unit cell 14 configured to supply a bias to an active bolometer, a skimming cell 12 configured to generate a skimming current used to eliminate a DC bias current from a signal current by supplying a bias to a blind bolometer, and an integrator 16 configured to integrate signal currents. The unit cell 14 maintains the bias of an active bolometer for detecting an infrared ray, generates an optical current, and performs a cell selection function. The unit cell 14 includes an active bias transistor Tr and a selection switch. The active bias transistor applies an active bias voltage Bolo_Bias-Vt for the operation of the active bolometer. The selection switch performs an ON/OFF operation in response to a control signal Active_Sel input from the outside, thereby controlling connection to a column bus. Accordingly, a current generated by the active bolometer may be transferred to a column circuit through a column bus. The skimming cell 12 maintains the bias voltage of the blind bolometer, generates a skimming current used to eliminate the DC bias current of the active bolometer, and performs a cell selection function. The skimming cell 12 includes a blind bias transistor and a selection switch. The blind bolometer is a resistor whose value is not varied by an infrared ray, and has the same resistance value as the active bolometer. The blind bias transistor applies a bias voltage Vskim−Blind_Bias−Vt for the operation of the blind bolometer. The selection switch performs an ON/OFF operation in response to a control signal Blind_Sel applied from the outside, thereby finally controlling connection to a column bus. Accordingly, the generated current may be transferred to a column circuit through the column bus.

In accordance with this configuration, when an infrared ray enters in the state in which a bias voltage has been applied to an active bolometer, a DC bias current and a signal current attributable to the entrance of the infrared ray flows through the active bolometer. Generally, the DC bias current is considerably higher than the signal current, and thus a change in output voltage attributable to the signal current is made to be considerably small if integration is performed via the integrator 16 without performing any processing. Accordingly, the skimming cell 12 generates a skimming current that is, used to eliminate a DC bias current using a blind bolometer that has approximately the same resistance value as the active bolometer. Only a target signal should be considerably amplified in such a way that a skimming current having the same magnitude as a DC bias current is generated by applying an appropriate bias voltage to the blind bolometer, thereby eliminating the DC bias current flowing through the active bolometer (current skimming) and then transferring only a signal current to the integrator 16. By supplying the amplified target signal to the active bolometer, only the signal current may be made to be applied to the integrator 16.

Meanwhile, in order to acquire a temperature detection result image, micro-bolometers may be configured as a focal plane array (FPA) in a 2D arrangement. Meanwhile, since the resistance of each bolometer is not ideally uniform, the output of the micro-bolometer FPA has non-uniform characteristics. In the meantime, in a process in which in order to extract a signal current, a DC bias current is eliminated and amplified, the non-uniformity between pixels is also amplified in proportion to the amplification of the signal current. As a result, a problem arises in that the saturation of the output signal occurs and an amplification factor is limited.

FIG. 2 is an output graph of the ROIC 10, which illustrates a histogram regarding outputs for respective pixels. The output of the ROIC 10 may fluctuate within a circuit dynamic range. Due to initial non-uniform characteristics for respective pixels, as illustrated in the histogram of FIG. 2, a range corresponding to a non-uniform range occurs, and a portion corresponding to the range cannot be used when a target is viewed. A final scene dynamic range may be defined as a range that is obtained by excluding a non-uniform range from a circuit dynamic range. Accordingly, it is important to ensure a maximum scene dynamic range by reducing a non-uniform range to a minimum range.

DISCLOSURE

Technical Problem

Accordingly, the present invention has been made keeping in mind the above problems occurring in the prior art, and an object of the present invention is to provide the read-out integrated circuit (ROIC) of an infrared sensor and a correction method that are capable of, in an infrared sensor using a micro-bolometer focal plane array (FPA), correcting the non-uniformity between bolometer resistance values using the ROIC, thereby minimizing the non-uniformity between pixels.

Another object of the present invention is to provide the ROIC of an infrared sensor and a correction method that are capable of maximizing the scene dynamic range of a micro-bolometer FPA.

A further object of the present invention is to provide the ROIC of an infrared sensor and a correction method that are capable of ensuring detection characteristics through the improvement of an amplification factor.

Technical Solution

In order to achieve the above objects, in accordance with the present invention, there is provided the read-out integrated circuit (ROIC) of an infrared sensor, including a cell array configured such that bolometers that detect infrared rays and output signal currents are arranged in an N×M matrix; a level generator configured to output a plurality of bias voltages corresponding to a plurality of bias levels; N NUC units disposed in a column direction of the cell array, and configured to supply different bias voltages to the respective bolometers; M NUC units disposed in a row direction of the cell array, and configured to supply different bias voltages to the respective bolometers; a control unit configured to set a bias voltage level of each of the NUC units in order to correct resistance non-uniformity of the cell array; and N integrators configured to integrate the signal currents output from the cell array.

In accordance with a detailed aspect of, the ROIC of the present invention, each of the NUC units may include a latch configured to store a plurality of resistance correction values corresponding to the plurality of bias levels; a decoder configured to decode the resistance correction values; and a level selection switch configured to perform an ON/OFF operation so that a corresponding bias voltage is set for the corresponding bolometer in accordance with a resistance correction value output by the decoder.

In accordance with another detailed aspect of the ROIC of the present invention, the level generator may include a first bias voltage generator configured to output a first bias voltage; a second bias voltage generator configured to output a second bias voltage having a voltage level different from that of the first bias voltage; and a resistance divider configured to receive the first bias voltage and a second bias voltage and output the plurality of bias voltages.

In accordance with another detailed aspect of the ROIC of the present invention, the control unit may sequentially set a plurality of resistance correction values stored in the latch, so that bias voltages are sequentially set for the respective bolometers, measures output voltages of the bolometers for each bias voltage, and sets a resistance correction value at which an average of the output voltages is measured as a reference output voltage.

In accordance with still another detailed aspect of the ROIC of the present invention, the ROIC may further include nonvolatile memory in which the set resistance correction value is stored.

In order to achieve the above objects, in accordance with the present invention, there is provided a method of correcting a ROIC of an infrared sensor including bolometers in a two dimensional matrix, the infrared sensor detecting an infrared ray and outputting a signal current, including, when power is applied, sequentially changing a bias voltage to each of the bolometers in accordance with a plurality of stored resistance correction values; when the individual bias voltages are set, measuring output voltages of the bolometers; calculating an average value of measured output voltages based on the setting of the individual bias voltages; selecting a resistance correction value at which the average value of the output voltage is measured as an output reference voltage; and storing the selected resistance correction value, and setting bias voltages to be supplied to the respective bolometers based on the resistance correction values.

In accordance with a detailed aspect of the method of the present invention, the method may further include, when power is applied, determining whether resistance correction values have been set; and if the set resistance correction values are present, the setting bias voltages to be supplied to the respective bolometers based on the corresponding resistance correction values.

Advantageous Effects

As described above, the ROTC and correction method of the present invention have the following advantages:

First, the non-uniformity between pixels can be minimized.

Second, the scene dynamic range of a micro-bolometer FPA can be maximized.

Third, detection characteristics can be ensured through the improvement of an amplification factor.

BRIEF DESCRIPTION OF DRAWINGS

FIGS. 10A to 10C illustrate the signal detection test result data of an infrared sensor to which an ROIC according to the present invention has been applied.

BEST MODE

Preferred embodiments of the present invention will be described in detail below with reference to the accompanying drawings.

Figure 1:
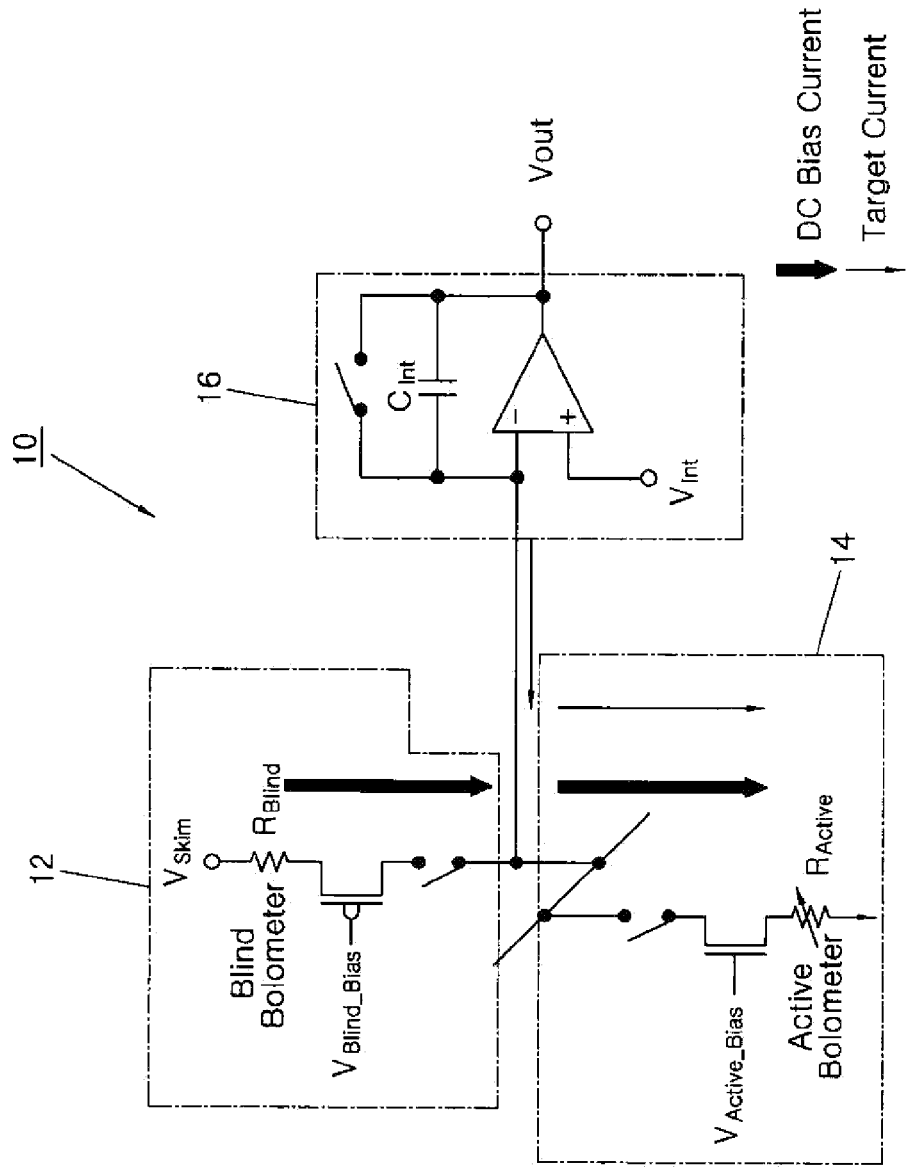
FIG. 1 is a basic configuration diagram of a Read-Out Integrated Circuit (ROIC)
Figure 2:
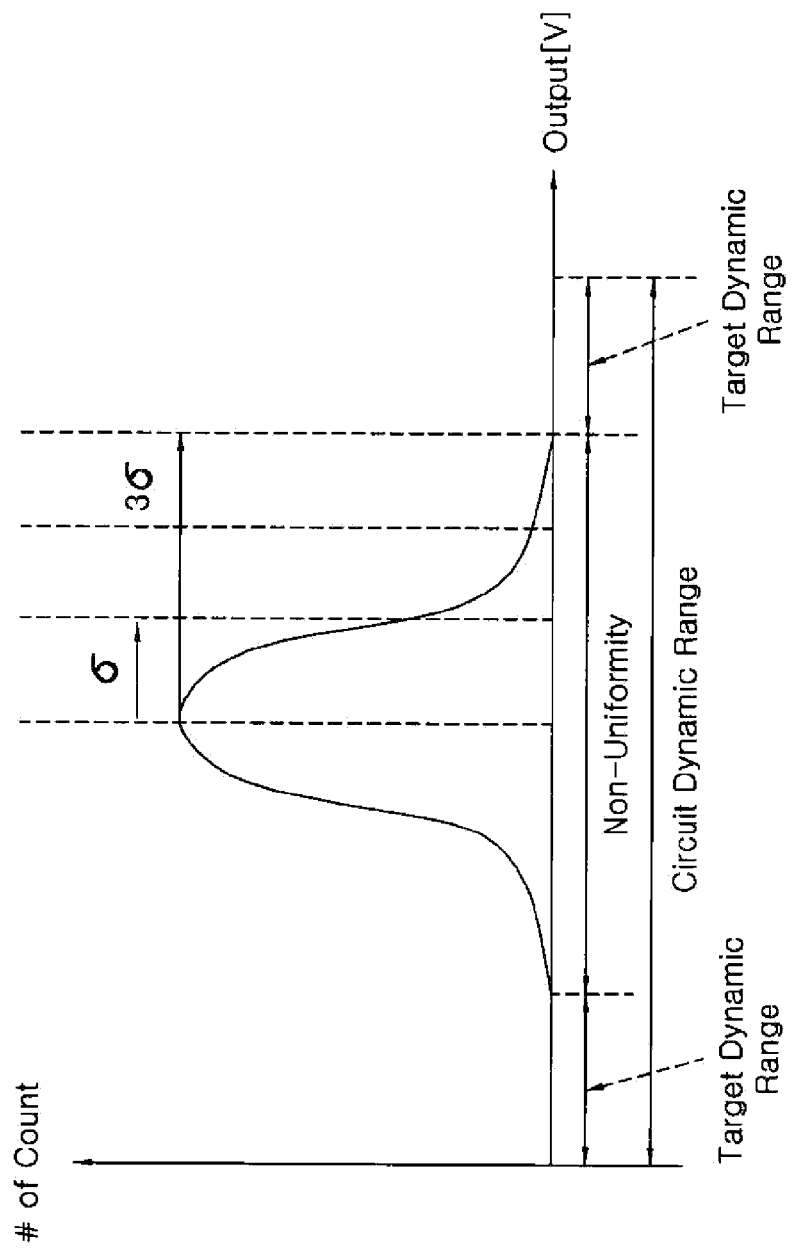
FIG. 2 is an output graph of the ROTC.
Figure 3:
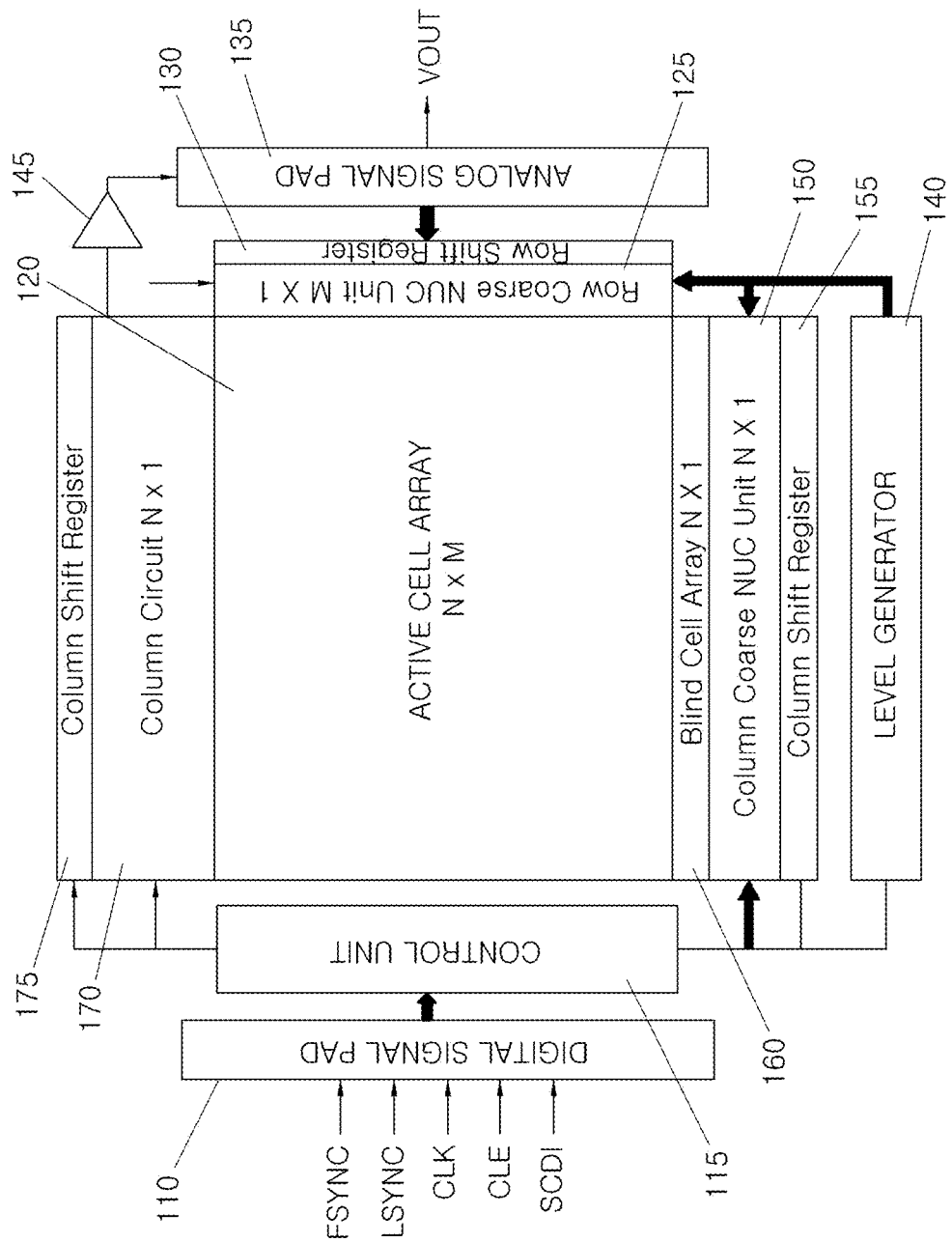
FIG. 3 is a circuit configuration diagram of an ROIC according to the present invention.

FIG. 3 is a configuration diagram of a Read-Out Integrated Circuit (ROIC) according to the present invention. The ROIC includes a digital signal pad 110 for the input of a control signal, an analog signal pad 135 for the output of a detected target signal, an active cell array 120 and a blind cell array 160, a column circuit 170, column & row coarse non-uniformity correction (C-NUC) circuits 150 and 125, column & row shift registers 175, 155 and 130, a control unit 115, a level generator 140, and an output amplifier 145.

The active cell array 120 generates a signal current attributable to infrared detection, and the blind cell array 160 eliminates a DC bias current from a current generated by the active cell array 120, thereby allowing only a signal current to be extracted. The column circuit 170 includes an integrator, and integrates a signal current to be output. Furthermore, the column circuit 170 may sample or hold a signal current. The column & row shift registers 175, 155 and 130 generate a selection signal for cell access in response to a control signal applied by the control unit 115. The output amplifier 145 amplifies a target signal integrated and output by the column circuit 170, and outputs the amplified target signal to the analog signal pad 135. The column & row C-NUC circuits 150 and 125 are disposed on the column and row sides of the active and blind cell arrays 120 and 160, and correct resistance non-uniformity in the active and blind cell arrays 120 and 160. The level generator 140 generates the bias levels of the column & row C-NUC circuits 150 and 125 and the bias level of the output amplifier 145. By means of this configuration, the resistance non-uniformity of the active and blind cell arrays 120 and 160 may be corrected by the column & row C-NUC circuits 150 and 125.

Figure 4:
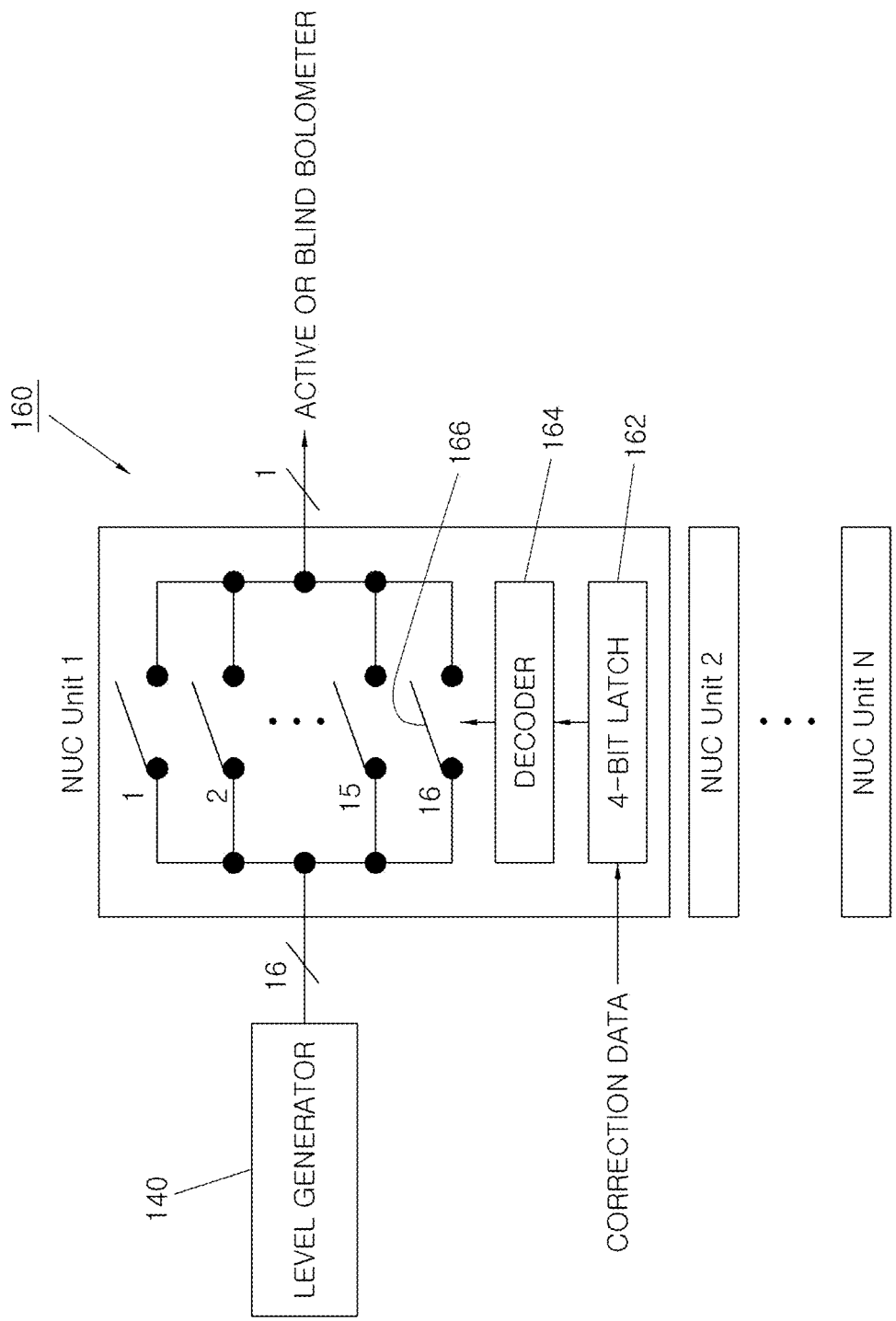
FIG. 4 is a circuit configuration diagram of the coarse non-uniformity correction (C-NUC) unit of FIG. 3.

FIG. 4 is a configuration diagram of a C-NUC circuit 150 or 125. The C-NUC circuit 150 or 125 includes a plurality of NUC units NUC Unit 1, NUC Unit 2, ..., NUC Unit N. Each of the NUC units includes a latch 162 configured to store a resistance correction value, a decoder 164 configured to decode a resistance correction value stored in the latch 162, and a level selection switch 166 configured to select one from among a plurality of bias levels in accordance with a resistance correction value.

The resistance correction value set using a predetermined number of bits is stored in the latch 162. For example, a 4-bit resistance correction value may be used, and the resistance correction value may be freely set using a 4 or more-bit value or a 3 or less-bit value. Bias levels may include 16 levels corresponding to a 4-bit correction value. The 16 bias levels are generated by the level generator 140, and are supplied to the NUC units NUC Unit 1, NUC Unit 2, ..., NUC Unit N in common. Each of the NUC units selects one from among the 16 bias levels by controlling the level selection switch 166 based on the resistance correction value stored in the latch 162.

Figure 5:
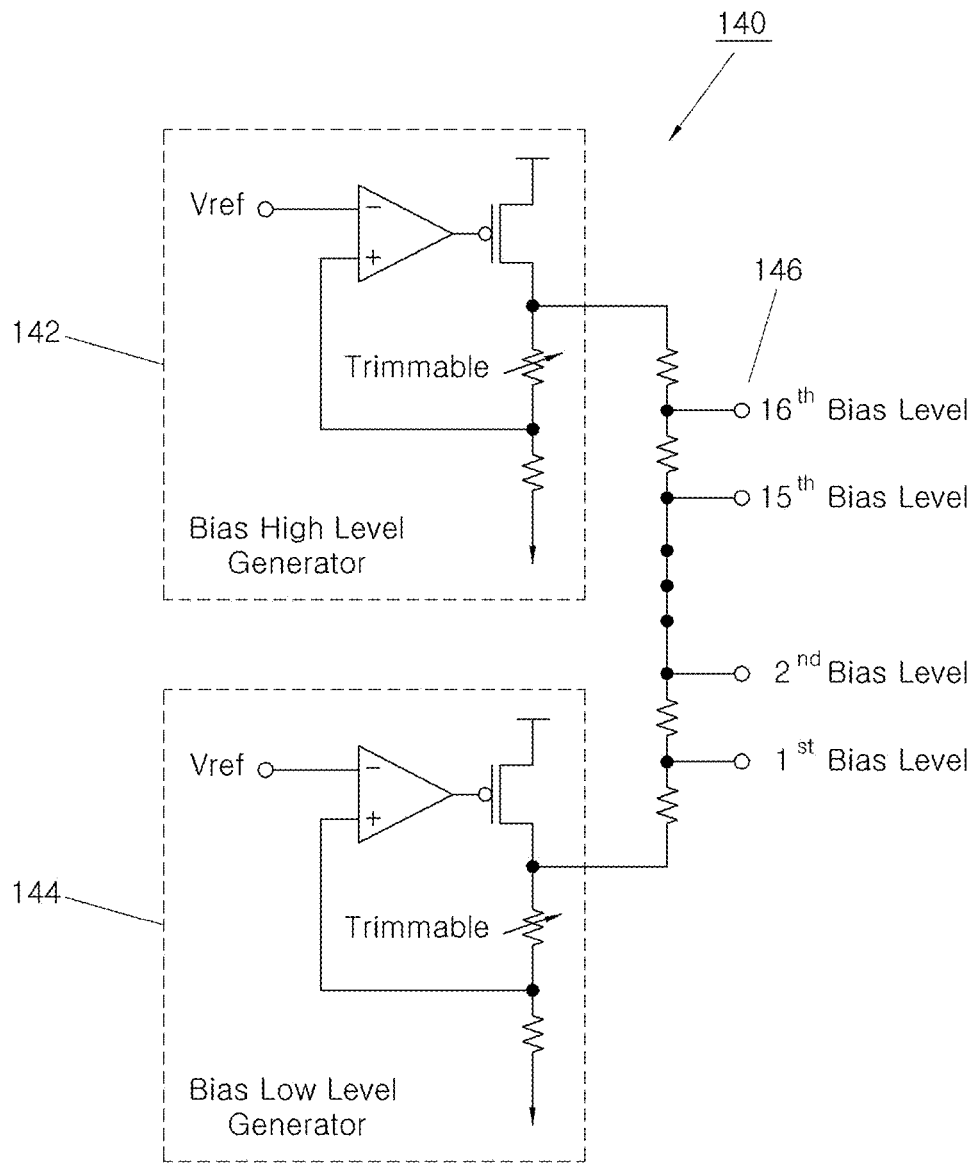
FIG. 5 is a circuit configuration diagram of the level generator of the C-NUC circuit according to the present invention.

FIG. 5 is a circuit configuration diagram of the level generator 140 that supplies the bias levels to the C-NUC circuits. The level generator 140 includes a bias high level generator 142, a bias low level generator 144, and a resistance divider 146 that generates the individual bias levels.

In this case, when 16 bias levels are generated, resistance divider 146 includes 16 resistance divider elements. Accordingly, the outputs of the bias high level generator 142 and the bias low level generator 144 are output as 16 bias voltages through the resistance divider 146. The 16 bias voltages are supplied to each of the NUC units NUC Unit 1, NUC Unit 2, ..., NUC Unit N. In this case, the bias high level generator 142 and the bias low level generator 144 may generate a reference voltage that is trimmed to various levels.

Figure 6:
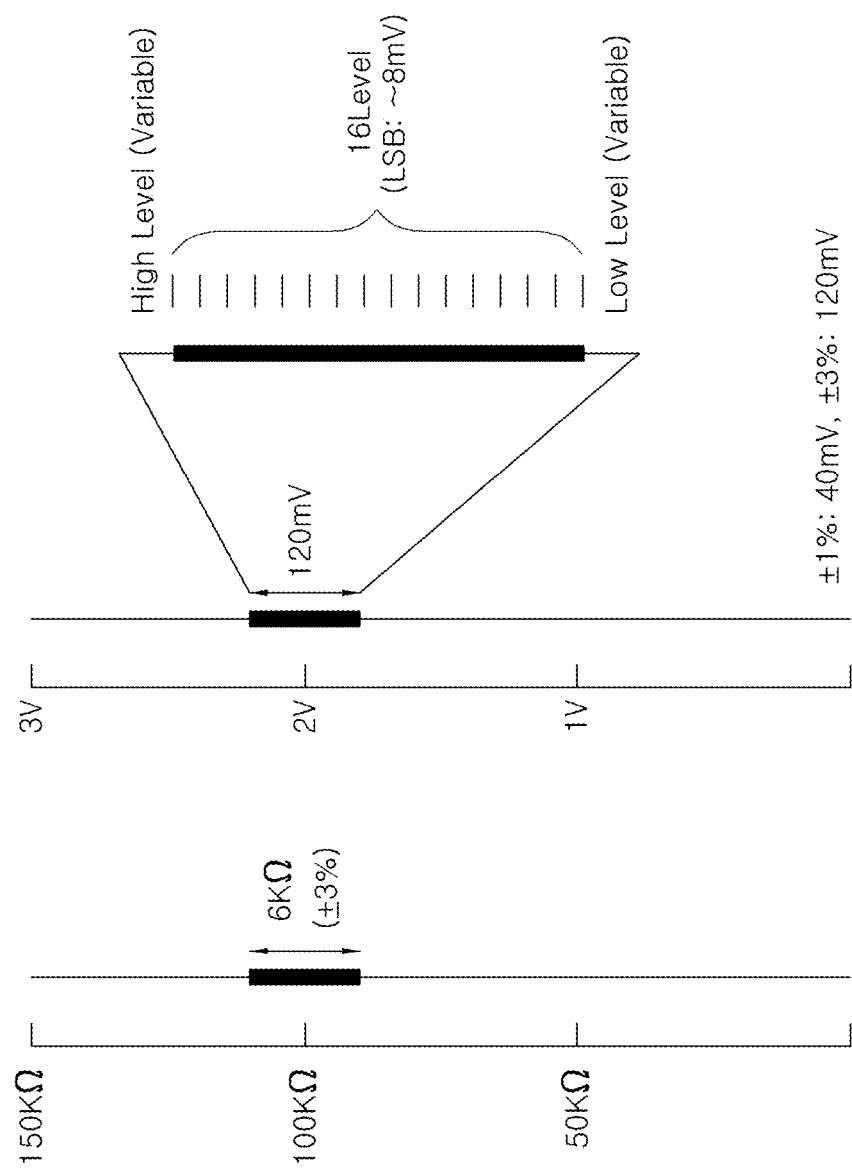
FIG. 6 is an operating status diagram of a C-NUC circuit according to the present invention.

FIG. 6 is an operating status diagram of the C-NUC circuits 150 and 125, which illustrates the range of basic level settings. In this embodiment, the resistance value of a target bolometer ranges from 100 to 200 kΩ and the non-uniformity between the resistances of a bolometer device is about 6 kΩ (±%). In this case, assuming that a bias voltage applied to the bolometer is 2 V, the voltage range of bias levels corresponding to non-uniformity is 120 mV. Accordingly, an example in which the resistance correction value has been set based on such a value is illustrated. In this case, the illustrated resistance values and bias levels may be varied to various values and then used.

Figure 7:
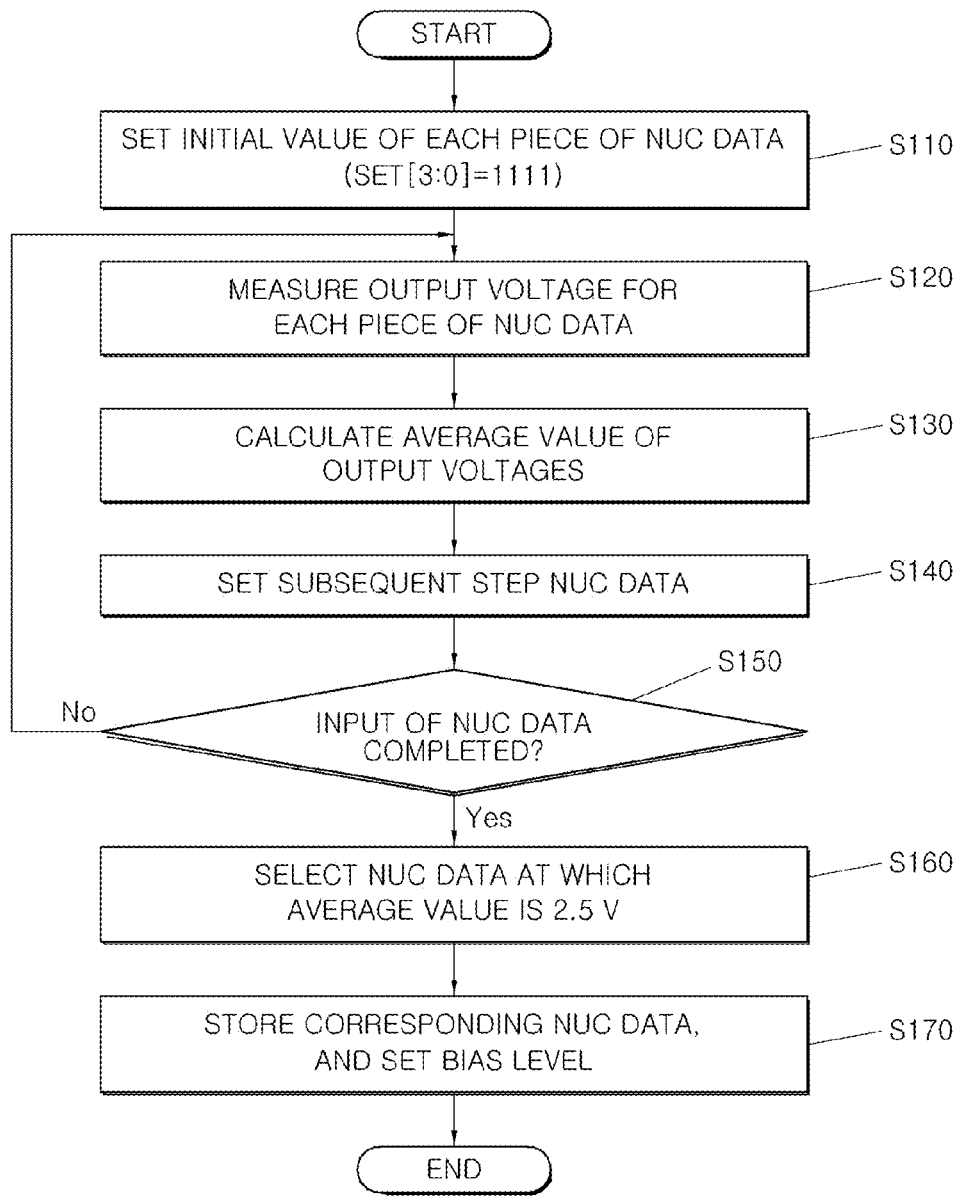
FIG. 7 is an operating flowchart illustrating a process of setting the resistance correction values of a C-NUC circuit in an ROIC according to the present invention.

FIG. 7 illustrates a process of setting the resistance correction values of a C-NUC circuit 150 or 125 in an ROIC according to the present invention. First, the initial value of the resistance correction value of the C-NUC circuits at step S110. If a 4-bit resistance correction value is used, the initial value may be set to "1111" (set[3:0]=1111). The output voltage of each of the NUC units NUC Unit 1, NUC Unit 2, ..., NUC Unit N is measured at step S120. The average value of the measured output voltages is calculated at step S130. A subsequent step resistance correction value is set for each NUC unit at step S140. It is determined whether the set resistance correction values have been all input at step S150. In the case where the initial value has been set to "1111," it may be determined that the stored resistance correction values have been all input if the resistance correction value is set to "0000" (set[3:0]=0000). Once each resistance correction value has been set, a resistance correction value at which the average value of the output values is output as 2.5 V is selected at step S160. The selected resistance correction value is stored and the bias level of a corresponding NUC unit is set based on the corresponding resistance correction value at step S170. The above process of setting the bias levels of the C-NUC circuit 150 or 125 may be performed both on the column C-NUC circuit 150 and on, the row C-NUC circuit 125.

Figure 8:
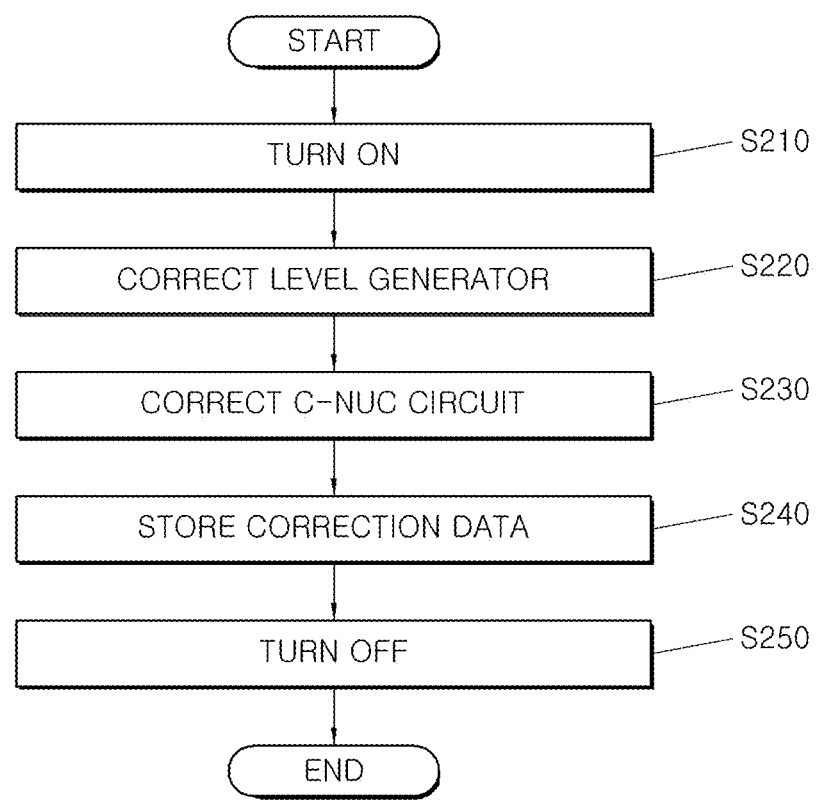
FIG. 8 is a flowchart of a test operation in an ROIC according to the present invention.

FIG. 8 illustrates a process of performing a test operation for the storage of correction data in an ROIC according to the present invention. When power is applied to an infrared sensor at step S210, the level generator of the ROIC measures the optimum bias value of the level generator using a test process, and then stores the optimum bias value. Furthermore, the resistance correction value of the C-NUC circuit is acquired by the above-described method at step S230. The bias value of the level generator and the resistance correction value of the C-NUC circuit acquired by the above test process are stored in nonvolatile memory at step S240. Once the correction data has been stored, the test operation has been completed at step S250.

Figure 9:
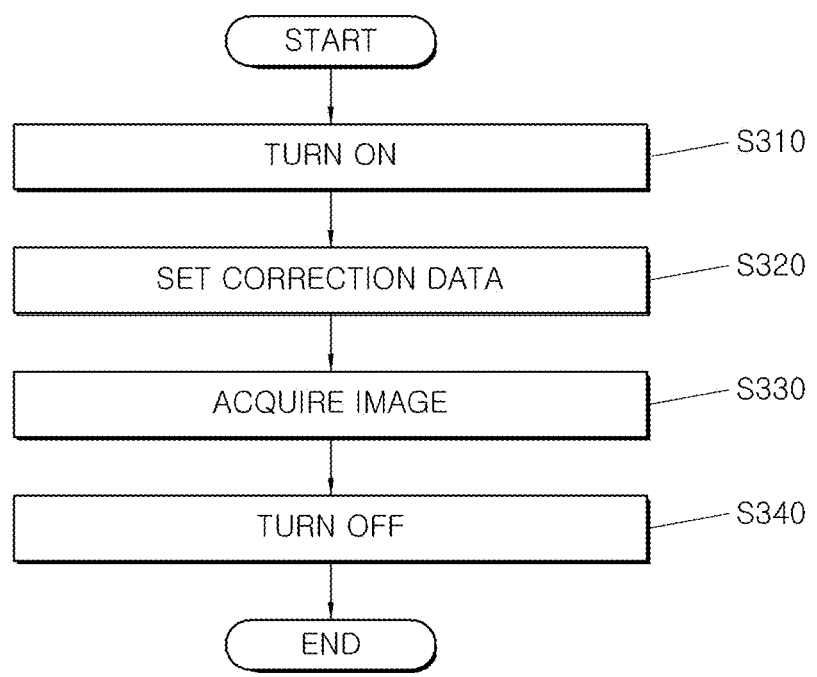
FIG. 9 is a flowchart of the signal detection operation of an ROIC according to the present invention.

FIG. 9 illustrates an operating flow in the case where in an ROIC according to the present invention, data for correction is stored and then power is applied. When power is applied at step S310, correction data stored in memory is loaded and then the bias of the level generator and the resistance correction value of the C-NUC circuit are set at step S320. An image attributable to infrared detection is acquired at step S330. The function of the infrared sensor is terminated at step S340.

Figure 10B:
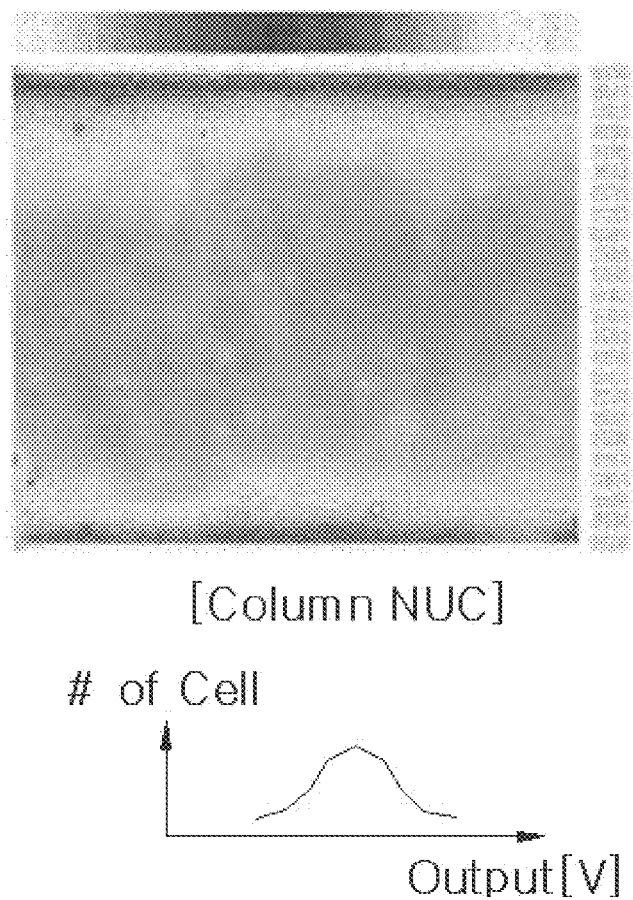

FIGS. 10A to 10C illustrate the signal detection test result data of an infrared sensor to which an ROIC according to the present invention has been applied. These drawings illustrate acquired infrared detection results and scene dynamic ranges according to the application of the C-NUC circuits. FIG. 10A illustrates signal detection results and a scene dynamic range in the case where a conventional ROTC was applied, in which case a fixed bias was input to the ROIC. As illustrated in the signal detection results of FIG. 10A, it can be seen that the detection results of a micro-bolometer were irregularly output. Furthermore, it can be seen that the proportion of a non-uniform range in the overall dynamic range of a scene dynamic range graph is large. FIG. 10B illustrates signal detection results and a scene dynamic range in the case where a ROIC according to the present invention was applied, in which case a column C-NUC circuit was applied. As illustrated in the signal detection results of FIG. 10B, it can be seen that the detection results of a column side were regularly output compared to those of FIG. 10A. Furthermore, it can be seen that the proportion of a non-uniform range in the overall dynamic range of a scene dynamic range graph is smaller than that of FIG. 10A. FIG. 10C illustrates signal detection results and a scene dynamic range in the case where a ROIC according to the present invention was applied, in which case C-NUC circuits were applied to both column and row sides. As illustrated in the signal detection results of FIG. 10C, it can be seen that the detection results of a micro-bolometer were output more regularly than those of FIG. 10B in which the C-NUC circuit was applied only to a column side. Furthermore, the proportion of a non-uniform range in the overall dynamic range of a scene dynamic range graph is smaller than that of FIG. 10B.

As described above, in order to overcome the resistance non-uniformity of an N×M micro-bolometer FPA, [N×1] NUC units are arranged in a column direction, [M×1] NUC units are arranged in a row direction and the bias level of each pixel is adjusted, thereby overcoming the resistance non-uniformity of the micro-bolometer FPA.

The invention claimed is:

1. A read-out integrated circuit (ROIC) of an infrared sensor, comprising:
 a cell array configured such that bolometers that detect infrared rays and output signal currents are arranged in an N×M matrix;
 a level generator configured to output a plurality of bias voltages corresponding to a plurality of bias levels;
 N non-uniformity correction (NUC) units disposed in a column direction of the cell array, and configured to supply different bias voltages to the respective bolometers;
 M NUC units disposed in a row direction of the cell array, and configured to supply different bias voltages to the respective bolometers;
 a control unit configured to set a bias voltage level of each of the NUC units in order to correct resistance non-uniformity of the cell array; and
 N integrators configured to integrate the signal currents output from the cell array;
 wherein the control unit:
 sequentially sets a plurality of resistance correction values, so that bias voltages corresponding to the resistance correction values are sequentially set for the respective bolometers, measures output voltages of the bolometers for each bias voltage, and selects and stores a resistance correction value at which a reference output voltage, is measured as an average of the output voltages; and when power is applied, sets corresponding bias voltages for the bolometers in accordance with the stored resistance correction values.

2. The ROIC of claim 1, wherein each of the NUC units comprises:
 a latch configured to store the plurality of resistance correction values corresponding to the plurality of bias levels;
 a decoder configured to decode the resistance correction values; and
 a level selection switch configured to perform an ON/OFF operation so that a corresponding bias voltage is set for the corresponding bolometer in accordance with a resistance correction value output by the decoder.

3. The ROIC of claim 1, wherein the level generator comprises:
 a first bias voltage generator configured to output a first bias voltage;
 a second bias voltage generator configured to output a second bias voltage having a voltage level different from that of the first bias voltage; and
 a resistance divider configured to receive the first bias voltage and a second bias voltage and output the plurality of bias voltages.

4. A method of correcting a ROIC of an infrared sensor including bolometers in a two dimensional matrix, the infrared sensor detecting an infrared ray and outputting a signal current, comprising:
 when power is applied, sequentially changing a bias voltage to each of the bolometers in accordance with a plurality of stored resistance correction values;
 when the individual bias voltages are set, measuring output voltages of the bolometers;
 calculating an average value of measured output voltages based on the setting of the individual bias voltages;
 selecting a resistance correction value at which the average value of the output voltage is measured as an output reference voltage; and
 storing the selected resistance correction value, and setting bias voltages to be supplied to the respective bolometers based on the resistance correction values.

5. The ROIC of claim 4, further comprising:
 when power is applied, determining whether resistance correction values have been set; and
 if the set resistance correction values are present, the setting bias voltages to be supplied to the respective bolometers based on the corresponding resistance correction values.

* * * * *